W. A. OTTO.
WHEEL TRUCK AND BRAKE GEARING.
APPLICATION FILED JULY 31, 1914.
1,172,164.
Patented Feb. 15, 1916.
2 SHEETS—SHEET 1.
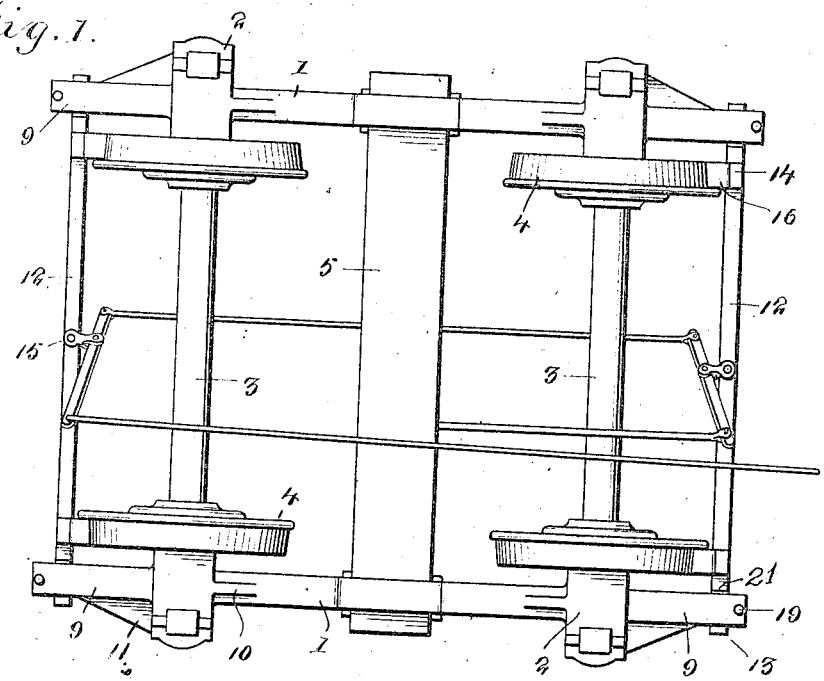
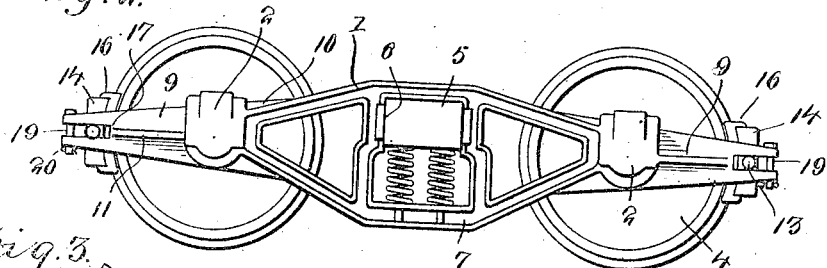
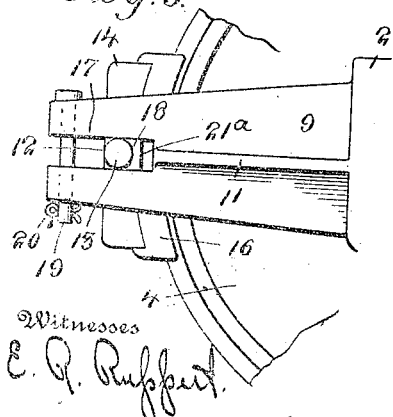
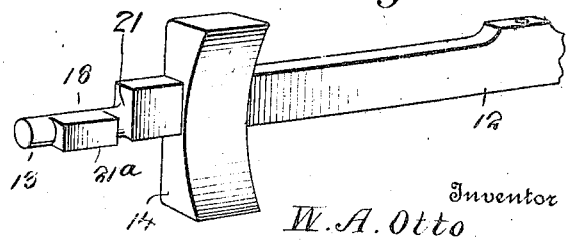
Inventor
W. A. Otto
By Victor J. Evans
Attorney
Witnesses
E. Q. Ruppert

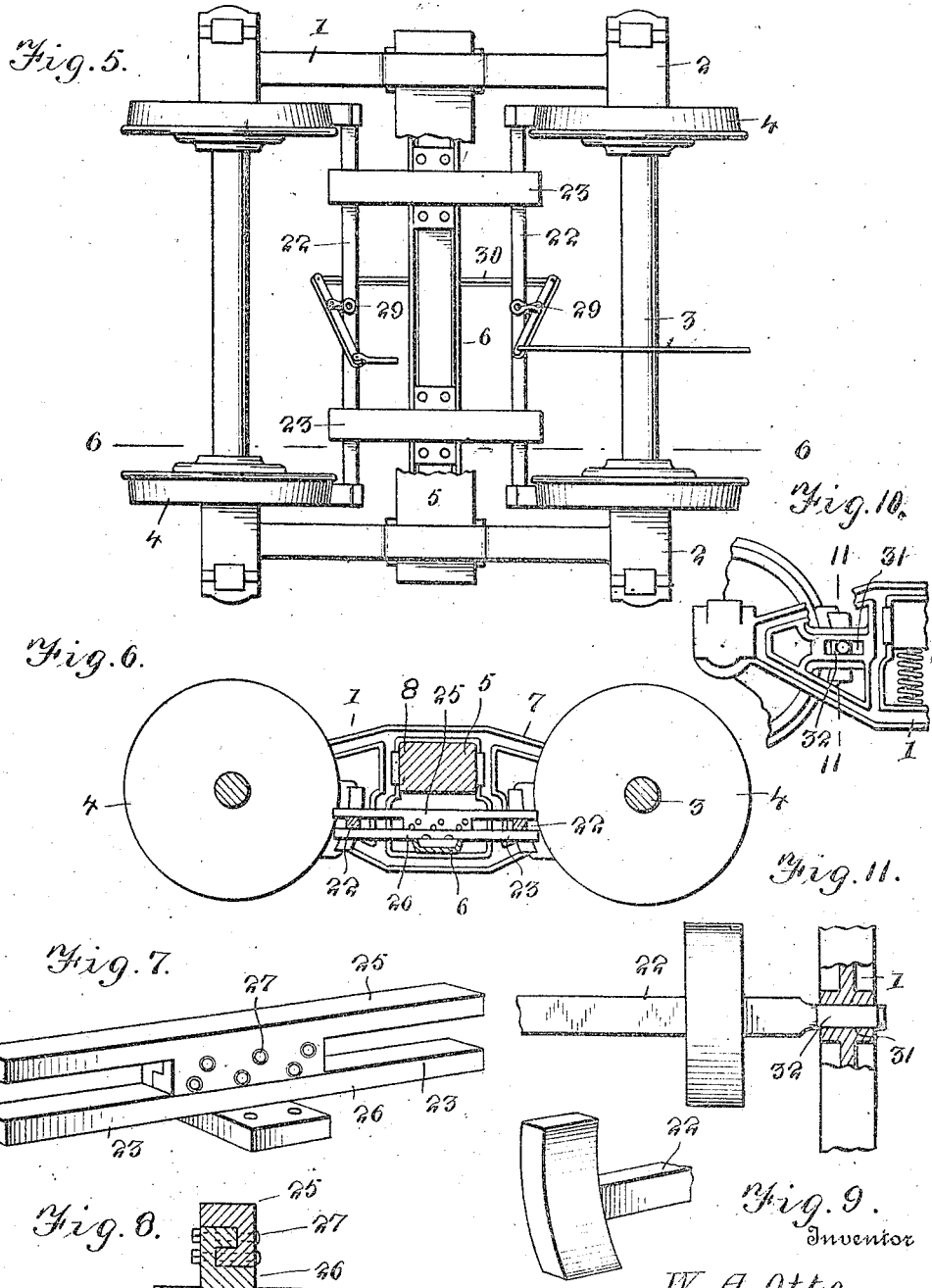

UNITED STATES PATENT OFFICE.

WILLIAM A. OTTO, OF MILWAUKEE, WISCONSIN.

WHEEL-TRUCK AND BRAKE-GEARING.

1,172,164.  Specification of Letters Patent.  Patented Feb. 15, 1916.

Application filed July 31, 1914. Serial No. 854,356.

*To all whom it may concern:*

Be it known that I, WILLIAM A. OTTO, a citizen of the United States, residing at Milwaukee, in the county of Milwaukee and State of Wisconsin, have invented new and useful Improvements in Wheel-Trucks and Brake-Gearing, of which the following is a specification.

This invention relates to improvements in wheel trucks and brake gearing for railway cars, particularly freight cars, and one of its objects is to provide a truck structure by means of which the brake beams may be mounted directly thereon, in such a manner as to dispense with the ordinary brake hangers and obviate any liability of the brake beams becoming disconnected and dropping.

A further object is to provide a truck and brake gear construction which admits of the arrangement of the brakes in such a manner as to furnish adequate room for the movements of the brake beams, as well as for the operation of the hand brake gearing to secure proper leverage.

A still further object of the invention is to provide a truck structure whereby the above stated advantages may be secured, and whereby each side plate of a truck frame may be formed of a single casting with extended end portions to carry the outside brake beams beyond the wheels.

A still further object of the invention is to provide a truck and brake gear structure whereby in the event of the wearing away of the brake shoes and brake heads grinding away of the ends of the brake beam will be avoided, thus preventing liability of dropping of the beam, while permitting all the other brake beams of a car to be operated in the usual manner.

A still further object of the invention is to provide a construction whereby a brake beam and brake heads may be moved integral in a single casting.

A still further object of the invention is to provide simple and effective guiding means whereby an inside brake beam may be mounted for efficient action upon the truck.

With these and other objects in view, the invention consists of the features of construction, combination and arrangement of parts herein fully described and claimed, reference being had to the accompanying drawings in which:—

Figure 1 is a top plan view of a wheel truck constructed in accordance with my invention, showing a construction for outside brake beams. Fig. 2 is an outer side elevation of the same. Fig. 3 is a similar view on an enlarged scale showing the construction at one end of the truck. Fig. 4 is a fragmentary perspective view of a brake beam. Fig. 5 is a top plan view of a wheel truck showing a construction for inside brake beams. Fig. 6 is a vertical longitudinal section on line 6—6 of Fig. 5. Fig. 7 is a perspective view of one of the guide brackets. Fig. 8 is a vertical transverse section of the same. Fig. 9 is a fragmentary perspective view of one of the inside brake beams. Fig. 10 is a fragmentary side elevation showing a modified construction. Fig. 11 is a cross section on the line 11—11 of Fig. 10.

Referring to Figs. 1 to 4, inclusive, of the drawings, 1 designates the side plates of a truck frame, 2 the journal boxes at the ends thereof, 3 the wheel axles, 4 the wheels mounted thereon, 5 the spring supported truck bolster, and 6 the sand board. The bolster and its supporting means may be of any of the constructions in common use, and the side plates of the frame may be connected and tied in any preferred manner, also the general construction and arrangement of parts may vary under different conditions of service and to suit different types of cars. Each side plate 1 is composed of a steel casting, and comprises, as usual, a substantially diamond-shaped body 7 formed with the guide opening 8 to receive the adjacent end of the bolster 5. The journal boxes 2 are arranged in the ordinary manner at the reduced ends of the side plates, but, in accordance with my invention, the side plates are provided with extended end portions 9 projecting beyond the journal boxes and to a certain distance outside the wheels, and webs 10 are formed between the reduced ends of the plates and journal boxes to secure greater strength and stability. I also provide the extensions 9 with longitudinally disposed strengthening ribs, webs or flanges 11. The plate 1, body portions of the journal boxes, and the end extensions 9 are preferably formed of a single steel casting, thus securing strength and durability with economy of construction. It will, of course, be understood that any suitable type of cross-ties or connections between the side plates may be employed.

12 designates the outside brake beams, and 13 the extended reduced ends thereof. Each of these beams is formed of a steel casting provided with brake heads 14 cast integrally therewith, the beam being suitably constructed to receive the brake lever bracket 15, and the brake heads being suitably constructed to receive the brake shoes 16. The extensions 9 of the side plates 1 are provided at their outer ends with longitudinally extending angular guide slots 17, which receive guide members 18 on the extended ends 13 of the beams 12, whereby said beams are mounted to slide toward and from the wheels in the application and retraction of the brake shoes. The slots 17 open through the outer ends of the extensions 9, to permit the beams to be readily applied and removed, and casual displacement of the beams is prevented by retaining pins 19 headed at one end and apertured at the opposite end to receive cotter pins 20, whereby they are held in position. It is evident that with this construction the outside brake beams may be mounted beyond the wheels and directly upon the truck frame, thus allowing the beams to have an ample range of motion, while at the same time dispensing with the use of hangers and the necessity of mounting the beams upon the car body. The beams are therefore securely sustained in position and cannot therefore become displaced or disconnected, thus obviating liability of accidents from the beams becoming detached and dropping. The inner ends of the slots 17 terminate slightly beyond the tread surfaces of the wheels, and the end partitions 13 of the beams are provided with stop shoulders 21 to hold the beams against endwise movement and with abutment or stop surfaces 21a to engage the inner end walls of the slots, whereby, in the event that the brake shoes are worn away the brake heads and ends of the beams will be prevented from coming in contact with the wheels and ground off, thus obviating any liability of the beams becoming displaced and dropping down.

In accordance with my invention, as shown in Figs. 5 to 9, inclusive, illustrating a construction for the use of inside brake beams, the inside brake beams 22 are slidably mounted within the slotted end portions 23 of a longitudinally extending guide bracket 24 suitably secured to the sand board 6, and said bracket is preferably composed of two longitudinally divisible sections 25 and 26 united by bolts or other suitable fastening members 27, thus allowing the top bracket section to be removed without disturbing the bottom bracket section for the application and removal of the brake beams 22. By this construction and mode of mounting the inner brake beams, which are carried directly upon the truck frame, an ample range of movement of said beams is permitted, and as these beams are arranged in direct horizontal alinement with the outer brake beams a maximum efficiency of braking action is secured. This mode of mounting also increases the range of motion so that proper leverage of the hand brake mechanism for adjusting said brake beams is afforded. As in the structures shown in Figs. 1 to 5, inclusive, the brake beams are provided with integral pivot struts 29 for the connection of the brake levers 30 therewith.

In the form of my invention shown in Figs. 10 and 11, the side plates 1 are provided with guide slots 31 located between the center of each beam and the journal box, which slots receive the ends 32 of the inside brake beams 22. Within the scope of the invention either the slotted supporting brackets or the slotted side plates shown in Figs. 10 and 11 may be employed to support the beams, as judgment or occasion may require.

It will be seen that the structures disclosed further permit ready access to all the parts of the brake gearing for their convenient removal, repairs and replacement, and provide a truck frame of strength and durability to sustain the strains imposed thereon.

I claim:—

A wheel truck including side plates, each having a diamond-shape body portion and triangular extensions beyond the ends of said body portion, and also provided with journal boxes integral with the inner ends of the diamond-shape body portion and the outer surfaces of the inner ends of the triangular extensions, said triangular extensions being longitudinally slotted at their outer ends and having reinforcing ribs on their outer surfaces extending between the journal boxes and slots and in axial alinement with the latter, axles journaled in the bearing boxes, wheels carried by said axles and arranged to lie inwardly of the slotted ends of the side pieces, brake beams provided with integral brake shoes to engage the tread surfaces of the wheels and having extensions beyond said shoes slidably fitted in the slots of the side pieces, said beams having extensions projecting through the slots in the side pieces and provided with angular enlargements slidably engaging said slots and spaced from said extensions, the latter being of greater depth than the slots to serve as stops engaging the inner surfaces of the side pieces to hold the brake beams from longitudinal movement, and said lugs being arranged to project inwardly and to lie in rear of the faces of the brake heads and in advance of the rear surfaces thereof, and adapted to abut against the inner walls of the slots when the brake shoes are worn to a predetermined extent, and fastenings passing through the ends of the triangular extensions and crossing the slots.

In testimony whereof I affix my signature in presence of two witnesses.

WILLIAM A. OTTO.

Witnesses:
 THOMAS GARDNER,
 CHARLES J. BUCKHOLZ.